July 11, 1944.  D. C. HULL  2,353,159
OXIDATION OF LOWER ALIPHATIC ALCOHOLS
Filed June 29, 1942
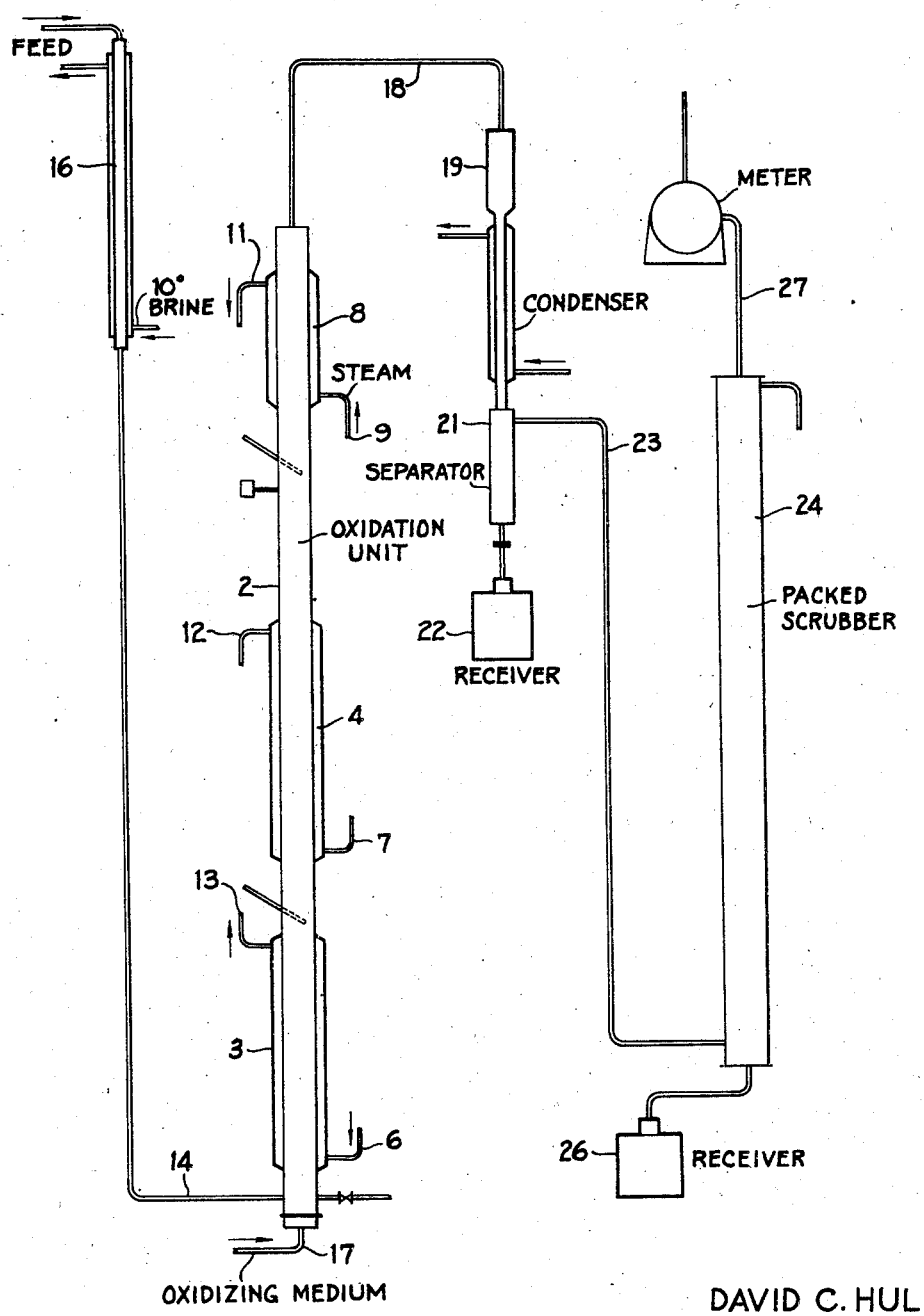
DAVID C. HULL
INVENTOR
BY
ATTORNEYS Patented July 11, 1944

2,353,159

UNITED STATES PATENT OFFICE 2,353,159

OXIDATION OF LOWER ALIPHATIC ALCOHOLS

David C. Hull, Kingsport, Tenn., assignor to Eastman Kodak Company, Rochester, N. Y., a corporation of New Jersey Application June 29, 1942, Serial No. 448,959

3 Claims. (Cl. 260—531)

This invention relates to the direct oxidation of organic compounds, particularly the oxidation of hydroxy compounds such as lower aliphatic alcohols oxidized directly to acids.

This invention is a continuation-in-part of my allowed application, Serial No. 228,822, filed September 7, 1938, now Patent No. 2,287,803.

As pointed out in connection with the aforementioned companion application, in the prior art oxidation processes have required employing relatively high temperatures such as 300° C. or 400° C. and the application of several steps. In other words, the oxidation either has not been direct, or if there has been direct conversion, the yields have been very low. For example, considering prior art procedure for converting ethanol to acetic acid, before my invention it was considered necessary to first dehydrogenate all of the ethanol and thereafter the aldehydic dehydrogenation product was converted to the acid which, as can be seen, involves a number of steps.

Carrying out oxidation processes in accordance with the prior art possesses a number of disadvantages exemplified, for example, by the required use of relatively high temperatures. Also there may in some instances be the disadvantage of polymerization of the products of the starting materials accompanied by low yields and other losses.

In my companion application aforesaid I have described a process for a more direct oxidation of organic compounds. While the process of my application functions very satisfactorily and gives good yields in relatively few steps, it involves the utilization of metals having an atomic number from 25 to 29. It is, therefore, apparent that it is desirable, particularly under present conditions, to develop a process in order that other metals may be employed and the process improved in other respects, as will be apparent from the description which follows.

After further investigation I have found that there are certain other catalytic materials which may be employed in direct oxidation processes in a manner akin to the procedure set forth in my companion application which not only permits obtaining direct oxidation, but permits the production of a relatively larger variety of products than has heretofore been obtainable.

The invention has for one object to provide a process for the direct oxidation of organic compounds. Another object is to provide a direct oxidation process which is particularly valuable for the direct conversion of lower aliphatic alcohols to lower aliphatic acids in substantially a single step. Still another object, however, is to provide a process which may also be applied to, not only the monohydroxy alcohols, but to the polyhydroxy alcohols and other similar organic compounds. Another and particular object of this invention is to provide a direct oxidation process which may be operated at relatively low temperatures and under ordinary pressure conditions, yet give very satisfactory yields of the desired oxidation products. Still another object is to provide a direct oxidation process for the conversion of alcohols to acids wherein the alcohol may be converted, not only to an acid having a number of carbon atoms corresponding to the number of carbon atoms in the alcohol molecule, but also to a different acid. A still further object is to provide a process which may be operated under other than normal atmospheric conditions, namely, under either superatmospheric or reduced pressures.

A further object is to provide a direct oxidation process that may be applied to either alcohols alone or mixtures of alcohols and aldehydes, or other types of mixtures. A still further object is to provide a direct, low-temperature oxidation process which may be applied to various mixtures of alcohols and aldehydes wherein both the alcohol and the aldehyde are converted into useful oxidation products. Another object is to provide a direct oxidation process, particularly adapted to the treatment of alcohols such as butyl alcohol and the like wherein, not only may butyric acid be obtained, but contents of other acids.

A further object is to provide novel catalysts containing liquids particularly adapted for employment in the aforesaid types of processes for the direct conversion of alcohols alone, or alcohols in various admixtures, into useful oxidation products. A still further object is to provide methods for producing the catalysts as well as for activating and utilizing the catalysts.

As already indicated, prior to my invention, if an alcohol were to be oxidized it was generally first dehydrogenated and then the dehydrogenation products further treated. In any event prior art processes as applied to alcohols usually involve the utilization of temperatures in excess of 300° C. which, not only requires substantial heat input but, due to the higher temperatures and other conditions required in handling chemicals, involves dangers of loss from polymerization or other undesired reactions. Also apparatus destruction may be more severe.

I have found that contrary to such procedure an organic compound, exemplified in particular by a hydroxy compound as a lower aliphatic alcohol, may be directly oxidized at relatively low temperatures, even temperatures substantially below 100° C., with any of the usual oxidizing mediums of which the commonest one, namely, air, may be readily utilized in my process. Also my process, after it is placed in operation, does not usually require any heat input but generates sufficient heat itself to maintain the reaction. Not only may single organic compounds be treated, but various mixtures of the organic compounds may be treated. For example, I have found that a mixture comprising a lower aliphatic alcohol, together with a corresponding or a different aldehyde, may be efficiently treated by my novel process and catalyst to give very high yields of aliphatic acid. By my process and choice of catalyst it is possible to obtain one or more acids in the oxidation procedure. The foregoing features, as well as features of treating various mixtures under different conditions, will be set forth in detail hereinafter.

While the oxidation procedure may be carried out in the apparatus described in the aforesaid companion application 228,822, now Patent No. 2,287,803, for convenience of consideration and for a better understanding of the present invention reference will be made to the attached drawing. The attached figure may be considered a semi-diagrammatic side elevation view showing a general apparatus arrangement which could be employed for carrying out my process.

Referring to the drawing, 2 represents an oxidation unit which may comprise any of several different constructions. For example, the preferred external construction would, in a large diameter unit, be in accordance with Hasche Patent 2,159,988. However, the construction may be a sieve plate column, bubble plate column, or other comparable arrangement for permitting the contact of an oxidizing medium containing free oxygen with the material to be oxidized. In the unit shown in the attached figure the column merely comprises an elongated, open column of relatively narrow dimensions. Attached to the lower part of the unit at 3 and 4, are cooling jackets provided with inlets for cooling medium as at 6 and 7.

The upper part of the unit was provided with a similar jacket 5; however, in this jacket, rather than cooling medium some heating medium may be circulated in the event that high boiling components are being directly oxidized or the reaction temperature is to be held lower than that which would maintain a constant volume of catalyst. Inasmuch as the construction is substantially the same, however, the mechanical construction would be approximately the same and an inlet provided at 9, 7, and 8; outlets are provided at 11, 12, and 13.

As indicated, if desired in place of the external jackets, coils may be included within the unit and in large-size units such arrangement wherein internal coils, or both coils and jackets are employed, may be desirable.

The lower part of the unit is provided with a plurality of inlet conduits, namely, inlet conduit 14 which is connected with a temperature-controlled feed supply 16. Also leading into the lower part of the unit is an inlet conduit 17 for oxidizing medium.

The upper part of the unit is provided with a drawoff conduit 18 which leads through condenser 19 into separator 21. This separator has attached thereto a receiver 22 for condensate and a branch conduit 23 through which noncondensables may be conducted to the scrubber 24.

The aforementioned scrubber is provided with a receiver 26 at the lower part thereof and vent conduit 27 from the upper part thereof, which may lead through a meter or other device for measuring and testing the effluents.

There may also be associated with the apparatus thermometers or other temperature controlling devices or various exchangers for recovering heat or otherwise facilitating or rendering the operation of the process more economical, or permitting it to be operated with automatic control. Hence, my invention is not to be restricted in these respects.

I have found that certain metal compounds, as for example, esters derived from the so-called platinum group metals and having atomic numbers between 44–82, may be incorporated in acidic solutions and that these solutions will function as a catalyst medium for the direct oxidation of organic compounds. That is, an alcohol alone or alcohol and other organic compounds to be oxidized, may be passed into a catalyst solution, as aforementioned, in the presence of oxidizing medium containing free oxygen and that the alcohol may be directly oxidized to acid, as will be observable in greater detail from the specific examples which follow.

Referring to the various metals which may be employed in accordance with my invention, there may be mentioned ruthenium, rhodium, palladium, osmium, iridium, and platinum.

In preparing catalyst solutions for use in the present process any convenient source of the metal may be employed, such as salts, oxides or other derivatives thereof. Preferably, a derivative would be chosen which is easily soluble under conditions prevailing in the process. For example, assuming that it is desired to convert an alcohol such as ethanol or butanol directly to the corresponding aliphatic acid, the derivative of the catalyst metal would preferably be chosen corresponding to this acid. Specifically, in the instance of producing acetic acid, there may be employed metal compounds such as silver, mercury or lead acetates, depending upon the particular metal or metals selected.

Further examples of metal derivatives which may be employed for producing the catalyst solution are rhodium acetate and palladium acetate.

While the aforementioned metal derivatives may be employed in various organic liquids, which are solvents therefor, for simplicity of operation and minimizing the necessity of complicated separations I prefer to dissolve the catalyst compound in a liquid principally comprised of one of the materials which is to be produced in the process. For example, in the event my process was to be applied in converting butyl alcohol directly into butyric acid I would preferably dissolve the catalyst compounds in an aliphatic acid such as butyric acid. However, propionic or acetic acid could also be used. However, for initially preparing the catalyst solution other liquids could be employed, as for example, organic esters and the like such as butyl or ethyl acetate.

In any event, irrespective of the exact metal compound and the liquid that the compound is dissolved in, the catalyst solution would be given a vigorous oxidation treatment such as blowing with a substantial amount of air usually for a period of at least 5 or 10 minutes, and if desired for several hours. This treatment would preferably be accompanied by the introduction of an aldehyde along with the oxidizing medium and functions to convert the metal ions of the catalyst metal into a higher state of valence than their lowest valence. The treatment may be accompanied by heating obtained in any convenient manner such as by flowing a heating medium in the jackets or coils in association with the oxidation unit or by introducing heated air. The temperature of treatment, however, may vary from around −5° C. up to the boiling point of the particular liquid present. In other words the solution is maintained under liquid phase conditions.

It is also preferred to incorporate the oxidizing medium into the catalyst liquid under at least atmospheric pressure as this permits the inclusion of a larger amount of oxidizing medium and fully saturates the catalyst liquid.

After the catalyst liquid containing a metal selected from the platinum group metals as specified above, has been treated and brought to a starting temperature, usually above room temperature, but below around 100° C., the organic compound to be oxidized may be supplied to the process.

That is, referring to the attached drawing, the oxidation column 2 is filled with the catalyst liquid comprising one or more platinum group metals as above specified dissolved in the solvent and maintained at the desired temperature. The hydroxy compound to be oxidized is introduced into the oxidation process through conduit 14 and the oxidizing medium, usually air (however, pure oxygen or ozone may be employed and appear to render the catalyst solution more active, but are not necessary), and the compound oxidized to one or more desired oxidation products, as will be described hereinafter.

Assuming that the oxidation product is a liquid, a portion thereof may be volatilized or pumped off through conduit 18 through the condenser 19 where condensables are condensed out to be collected in receiver 22. The unconsumed gases (as nitrogen when air is used in oxidizing medium) unoxidized organic compound and the like components, uncondensed, pass through conduit 23 into scrubber 24 where they are recovered. While only a single scrubbing unit has been indicated, a plurality of such units may be employed or other recovery devices utilized.

The operation of my process to convert an organic compound such as butyl alcohol to aliphatic acids and the functioning of various of the platinum group metals as above specified as catalysts is believed quite clearly illustrated by the data appearing in the following table:

and at a temperature between 30° C. and 50° C. While a 2.5% to 4% catalyst solution has been indicated, the amount of catalyst may vary from a small amount to a saturated solution, but in general the amount of catalyst will be maintained between 1% or 2% and 12%.

While the foregoing examples are illustrative of one of the preferred applications of my process, my process may be operated with the various other catalysts referred to and under various other conditions, as will be apparent from the examples which follow:

*Example IV*

In accordance with this example a catalyst solution is composed of 1000 parts of acetic acid having dissolved therein 0.5 part of antimony acetate, 0.5 part of palladium acetate, 0.5 part of platinum acetate and 10.0 parts of stannous acetate. This solution is employed as previously described with a feed of 1000 grams of acetaldehyde and 500 grams of n-butyl alcohol. On this ratio is obtained an average yield of 10–175 grams of butyric acid and 0–50 grams of propionic acid as the major products of the oxidation process. As in the preceding examples the process was operated so that the catalyst solution was maintained in the liquid phase. However, in the instance of alcohol, as butyl alcohol, it is possible, if it is desired to operate with temperatures up to nearly 150° C., that a higher temperature can be employed as pressure is applied to the reaction. In this reaction some excess oxidizing medium (air) may be supplied to the reaction so that a content of oxygen was indicated in the off gases.

When ethyl alcohol or propyl alcohol is used in place of or in admixture with butyl alcohol, lower temperatures may be employed. Furthermore, the pressure may be varied within rather wide limits without basically changing the process. Similarly, the catalyst may be employed as a salt or mixture of salts of any organic acid or acids, or a mixture of the metals themselves may be employed.

In the foregoing examples there was some alcohol left unchanged which may be recovered either in the scrubber or otherwise. As indicated, while at normal atmospheric pressure a temperature under 100° C., and in many instances between 30° C. and 50° C., appears to be quite satisfactory, the process may be caused to operate even at temperatures as low as −5° C. and up to the boiling point of the catalyst solution.

In preferred operation using, for example, the air as an oxidant, this may be supplied under some pressure and if desired a rather substantial excess can be incorporated, although for normal operations a slight excess, merely so that a few per cent of oxygen are indicated in the effluents, would be employed. In the event of the use of other oxidants such as relatively pure oxygen and ozone, smaller amounts are required and may be supplied under substantial pressure for causing

| Metal acetate | Per cent metal salt in catalyst solution | Weight butyl alcohol fed | Weight acetaldehyde fed | Weight butyric acid produced | Weight propionic acid produced | Per cent conversion butyric acid | Per cent conversion propionic acid |
|---|---|---|---|---|---|---|---|
| I. Silver | 4 | 241 | 483 | 12.37 | 14.43 | 4.32 | 6.00 |
| II. Mercury | 2.5 | 287 | 863 | 100.4 | 41.9 | 29.4 | 14.6 |
| III. Lead | 4 | 292.8 | 587.2 | 17.43 | None | 5.01 | |

The foregoing examples were carried out in apparatus as indicated in the attached drawing them to fully permeate the entire catalyst solution.

While in certain of the foregoing examples we have indicated the utilization of butyl alcohol in admixture with acetaldehyde, a comparable mixture of ethyl alcohol and butyraldehyde may be processed in the same manner to obtain a mixture of acetic and butyric acids. Similar remarks apply to the employment of other mixtures of alcohols and aldehydes. That is, ethyl alcohol may be processed in admixture with acetaldehyde to produce relatively pure acetic acid. Or, for example, propyl alcohol may be processed in accordance with the present invention in the presence of acetaldehyde, butyraldehyde, or propionaldehyde. However, inasmuch as acetaldehyde is in many instances most readily available and has a low boiling point, it would preferably be employed along with the other alcohols such as butyl alcohol, amyl alcohol, and the like as representing the most economical procedure as well as tending to lower the boiling points and permitting the functioning of the process at lowest temperatures.

As already indicated, the pressure may be varied over wide limits without basically changing the process. However, since the process functions satisfactorily under normal atmospheric pressures I prefer to operate under such conditions except that in some instances, such as for saturating the catalyst solution with oxygen, I may apply a few pounds pressure up to 2 or 3 atmospheres for this purpose. Also, as indicated, the process functions very well at ordinary temperatures of 30° C. to 50° C. However, by raising the temperatures above the range indicated and applying some increased pressure, larger amounts of alcohol may be converted per pass per unit of time. Under such procedure the aldehyde feed would be correspondingly reduced as the amount of alcohol fed was increased.

As apparent from certain of the preceding examples one valuable aspect of the present invention is that acids having fewer carbon atoms than the alcohol being oxidized may be directly produced and the proportion of these other acids to the acid having the same number of carbon atoms as the alcohol being oxidized may be varied by choice of the particular catalyst, as apparent from Examples I, II, III and IV set forth above.

It is apparent from the foregoing that my invention is applicable to the direct oxidation of the various organic compounds, particularly hydroxy compounds such as various alcohols. The foregoing examples are merely illustrative of some of the materials to which my low temperature liquid phase process may be applied, but various other compounds, such as hydroxy alcohols exemplified by glycols, may be treated in a comparable manner. Hence, I do not wish to be restricted in my invention excepting insofar as is necessitated by the prior art and the spirit of the appended claims.

What I claim and desire to secure by Letters Patent of the United States is:

1. A process for the direct oxidation of a lower aliphatic alcohol to obtain the corresponding aliphatic acid, which comprises treating a solution of a metal ion of a metal of the platinum group in an aliphatic acid with an aldehyde and a gaseous oxidizing medium to form a catalyst solution, introducing material amounts of a lower aliphatic alcohol and a lower aliphatic aldehyde into the activated catalyst solution, oxidizing the alcohol of the resulting solution of catalyst, alcohol and aldehyde by treating said solution with a gaseous oxidizing medium, maintaining the temperature of the solution of catalyst, alcohol and aldehyde during its treatment with the gaseous oxidizing medium such that the solution is maintained in the liquid phase, and subsequently recovering the aliphatic acid produced.

2. A process for the direct oxidation of a lower aliphatic alcohol to obtain the corresponding aliphatic acid, which comprises treating a solution of a metal ion of a metal of the platinum group in an aliphatic acid with an aldehyde and a gaseous oxidizing medium to form a catalyst solution, introducing material amounts of a lower aliphatic alcohol and a lower aliphatic aldehyde into the activated catalyst solution, oxidizing the alcohol of the resulting solution of catalyst, alcohol and aldehyde by treating said solution with a gaseous oxidizing medium, maintaining the temperature of the solution of catalyst, alcohol and aldehyde during its treatment with the gaseous oxidizing medium such that the solution is maintained in the liquid phase at a temperature of from −5 to 150° C. and subsequently recovering the aliphatic acid produced.

3. A process for the direct oxidation of a lower aliphatic alcohol to obtain the corresponding aliphatic acid, which comprises treating a solution of a palladium salt in an aliphatic acid with an aldehyde and a gaseous oxidizing medium to form a catalyst solution, introducing material amounts of a lower aliphatic alcohol and a lower aliphatic aldehyde into the activated catalyst solution, oxidizing the alcohol of the resulting solution of catalyst, alcohol and aldehyde by treating said solution with a gaseous oxidizing medium, maintaining the temperature of the solution of catalyst, alcohol and aldehyde, during its treatment with the gaseous oxidizing medium such that the solution is maintained in the liquid phase below 150° C., and subsequently recovering the aliphatic acid produced.

DAVID C. HULL.